United States Patent [19]
McAlhaney

[11] 3,931,899
[45] Jan. 13, 1976

[54] BALE-HANDLING EQUIPMENT

[76] Inventor: Norman E. McAlhaney, Rte. 3, Box 383, Orangeburg, S.C. 29115

[22] Filed: July 22, 1974

[21] Appl. No.: 490,242

[52] U.S. Cl............................ 214/38 CC; 296/28 M
[51] Int. Cl.²......................................... B65G 67/02
[58] Field of Search ............ 214/38 C, 38 CC, 310; 296/28 M, 50; 108/52; 105/370, 371, 372

[56] References Cited
UNITED STATES PATENTS

| | | | |
|---|---|---|---|
| 1,306,158 | 6/1919 | Walker | 214/38 CC |
| 2,509,682 | 5/1950 | Golrick | 214/38 CC X |
| 2,808,157 | 10/1957 | Terrill | 214/38 CC X |
| 3,148,912 | 9/1964 | Curtis et al. | 296/50 |
| 3,155,415 | 11/1964 | Gale | 294/67 |
| 3,420,564 | 1/1969 | Jensen | 294/67 |
| 3,499,550 | 3/1970 | Jensen | 214/6 |
| 3,521,762 | 7/1970 | Walters | 214/6 |

Primary Examiner—Robert G. Sheridan
Attorney, Agent, or Firm—Synnestvedt & Lechner

[57] ABSTRACT

Mobile apparatus, particularly a trailer adapted to be towed by a hay baler, the trailer having a bed including a forward decked section on which a workman stands to receive the bales from the baler, and a platform extending rearwardly therefrom on which the bales are stacked. The platform is made up of spaced members defining gaps therebetween for the elevation of the tines of a fork lift apparatus therethrough for the removal of the stack, and there are hinged plate members and operating means therefor for closing the gaps for the safety of the workman during the stacking operation. The trailer additionally includes a hinged end gate and side walls, the latter being mounted for rocking movement to release the stack for the removal thereof. The fork lift apparatus employed for the removal of a completed stack from the trailer and which is carried by the front or rear of a mobile unit such as a tractor, includes, in addition to the tines for insertion in the gaps, a pusher device and means for operating the same for forcing the stack off the tines when the stack has been transported by the tractor to the desired location.

14 Claims, 12 Drawing Figures

BALE-HANDLING EQUIPMENT

BACKGROUND OF THE INVENTION

1. Field of the Invention

The invention relates to agricultural apparatus and, more particularly, to appartus for the reception of bales of hay or other fodder as the bales are produced by a baler during its travel across the field and to apparatus for the transport of the bales in stacks to the place of use or storage.

2. Description of the Prior Art

In conventional hay-baling operations, the baler, during its movement across the field, deposits the bales on the field as produced, the individual bales thereafter being manually picked up from the field and loaded on a suitable transport means by which they are conveyed to the storage area where they are manually unloaded and stacked. Such operations are laborious and time-consuming. Numerous attempts have been made to develop equipment which would perform some or all of these tasks, but such equipment generally has been undesirably complicated, expensive and costly to maintain and operate. For example, trailers have been built that are adapted to be towed by hay balers, the trailers directly receiving the bales from the baler and mechanically accumulating the bales in the form of a stack. However, in these known constructions, the stacks of bales are discharged onto the field for later pick-up which is performed in some instances by special types of fork lift apparatus.

Apparatus of the above-mentioned type is typified, for example, in U.S. Pat. No. to Gale 3,155,415, issued Nov. 3, 1964. This patent disclosed a sled-type bale accumulator drawn by the baling machine, the acumulator including a platform mounted for rocking movement between horizontal and rearwardly tipped positions. The bales are stacked on the platform while it is in a horizontal position, the first or lower layer of bales being placed in spaced parallel relationship to provide gaps therebetween. When the stack is completed, the platform is rocked to deposit the stack on the field. For the removal of the stack, a fork lift apparatus, which is carried by a tractor and which has tines for insertion in the gaps between the bales of the lower layer and also for positioning adjacent the outer sides of the outermost bales of said layer, the tines carrying special mechanisms having prongs for insertion into the bales of the lower layer, and also carrying support means for the overlying layers, is employed. Following the positioning of the tines as mentioned above and the operation of the mechanism to insert the prongs, the fork lift is elevated to lift the stack off the field and the stack is then transported to the storage point by the tractor.

As will be recognized, the fact that the bales must first be deposited on the field, which, due to unevenness of the terrain, may well shift the bales of the lower layer from their required positions, is an undesirable feature. Also, because the bales of the lower layer must be spaced apart, the stack, when delivered to the point of storage, is not of the desired compactness. Furthermore, the mechanisms as mentioned above to secure the elevation of the stack from the field are relatively complicated and expensive.

SUMMARY OF THE INVENTION

The principal object of the invention is the provision of hay bale-handling equipment including a bale accumulator to be towed by the baler and on which the bales are stacked and which provides for the ready removal of stacks of bales therefrom for transport to the place of storage.

Another object of the invention is the provision of equipment attaining the foregoing object which is relatively trouble-free, economical with respect to initial cost, upkeep and operation, and which is adaptable to the handling of bales of varying sizes.

Another object of the invention is the provision of equipment attaining the foregoing objects in which the accumulator is so constructed that the stack may be removed directly from it for transport to the point of storage by a tractor-supported fork lift device.

A further object of the invention is the provision of equipment attaining the foregoing objects which ensures bale stacks of compact characteristics for deposit at the place of storage.

A still further object of the invention is the provision of equipment attaining the foregoing objects in which the tractor-supported fork lift device for cooperation with the trailer includes means providing for the ready deposit of the stack of bales at the place of storage.

The foregoing, and other objects of the invention as will become apparent, are attained by a mobile unit or accumulator, preferably a three-wheeled trailer, adapted to be towed by the baler and to receive the bales directly therefrom. The trailer has a bed including a forward decked section on which a workman stands for the reception and handling of the bales as they are conveyed to his position from the baler over a suitable slide or the like. The remainder of the bed consists of a platform formed by the upper flanges of spaced load-supporting beams on which the bales are stacked by the workman in any desired arrangement and tiering. The spaces between the flanges of the beams permit, as will hereinafter be pointed out in more detail, the elevation of the tines of a fork lift head therethrough for the removal of the stacked bales.

For the safety of the workman during the stacking operation, plate elements are provided supported for movement between positions in which they close the gaps between the beam flanges and positions, when the stack is to be removed by the tines of the fork lift head, in which the gaps are open. The gap-closing apparatus includes linkage and an operating handle whereby the plate elements may be swung in unison between the two positions and also includes means for temporarily locking the plate elements in their gap-closing positions.

The trailer has side walls, each consisting of a rectangular frame enclosing a wire mesh. The frames of the side walls are horizontally hinged to the bed, the hinging being such that the centers of gravity of the side walls are outside of the hinge lines whereby the walls, when unrestrained, will swing outwardly, the extent of such swinging being controlled by suitable means. The trailer also includes a rear or end gate mounted for swinging movement on a frame element of one of the side walls, and there is means for releasably locking the gate in its closed position, the locking means of the preferred embodiment being combined with releasable means for securing the side walls in their erect positions.

The tractor-supported fork lift head previously mentioned for removing the bale stacks from the trailer and transporting them to the place of storage is of generally conventional construction and includes a rear wall frame structure having a series of tines projecting therefrom, the tines in this instance being dimensioned to be readily received within the gaps between the flanges of the beams of the platform. The fork lift head is adapted to operate in a conventional manner to move the tines thereof between lowered and raised positions. The fork lift head of the present invention also includes a stack push-off located to contact the lower layer of a stack supported by the tines, the push-off being carried by arms rockably mounted at the rear end of the fork lift head. Suitable means, such as a hydraulic piston/cylinder device, is provided for swinging the push-off member between a position in which it is in contact or substantial contact with the rear wall frame structure of the fork lift head and a position forwardly thereof.

In the operation of the apparatus briefly described above, the side walls of the trailer are rocked to their erect positions, the end gate is swung to a closed position and the locking means manipulated to secure the side walls and the end gate in such positions. Also, the operating handle for the linkage for controlling the plate elements is manipulated to swing the plate elements to their gap-closing positions. A workman then mounts the decked section of the trailer. As the trailer is drawn over the field by the baler, the bales produced are delivered by a suitable chute to the decked section where they are picked up by the workman and stacked in any suitable tiering arrangement on the platform, but with the bales of the first or lower layer extending transversely thereof. When a stack of the desired number of bales is achieved, the baler is brought to a halt and the workman descends from the deck and manipulates the mechanism to open the rear gate and to release the side walls to permit them to swing outwardly away from the stack. He also manipulates the mechanism to swing the gap-closing plate elements to their gap-opening positions.

The fork lift head installed on the front or rear of a tractor with its tines in a lowered position is advanced to place the tines below the gaps between the upper flanges of the platform beams. The fork lift head elevating means is then operated to elevate the tines through the openings and lift the stack of bales from the trailer. The fork lift head with the stack of bales thereon is then drawn away from the trailer and conveyed by the tractor to the place of storage. Upon its arrival at the storage point, the fork lift device is moved downwardly until the ends of the tines contact or substantially contact a level surface, as for example the floor of the storage facility. The tractor is then driven in a direction to withdraw the tines from under the stack and at the same time the push-off is operated to hold the stack at the storage point while the times are being withdrawn. In the meantime, the baler and trailer have resumed operations to form a second stack.

The trailer described above and as hereinafter disclosed in detail is of the rear-unloading type, the beams defining the gaps for the reception of the tines extending longitudinally of the trailer. However, the trailer may be built for side-unloading if desired. In such instance, the beams would extend transversely of the trailer bed and one of the side walls would be converted to the gate adapted to be opened for the removal of the stack. Also, the rear wheels of the trailer would be supported as by extensions from the trailer chassis to provide clearance for the entry of the tines of the fork lift head between the beams. In the stacking of the bales, the first or lower layer would be placed to extend transversely of the beams with the result that the bales would also extend longitudinally of the platform.

Figure 1:
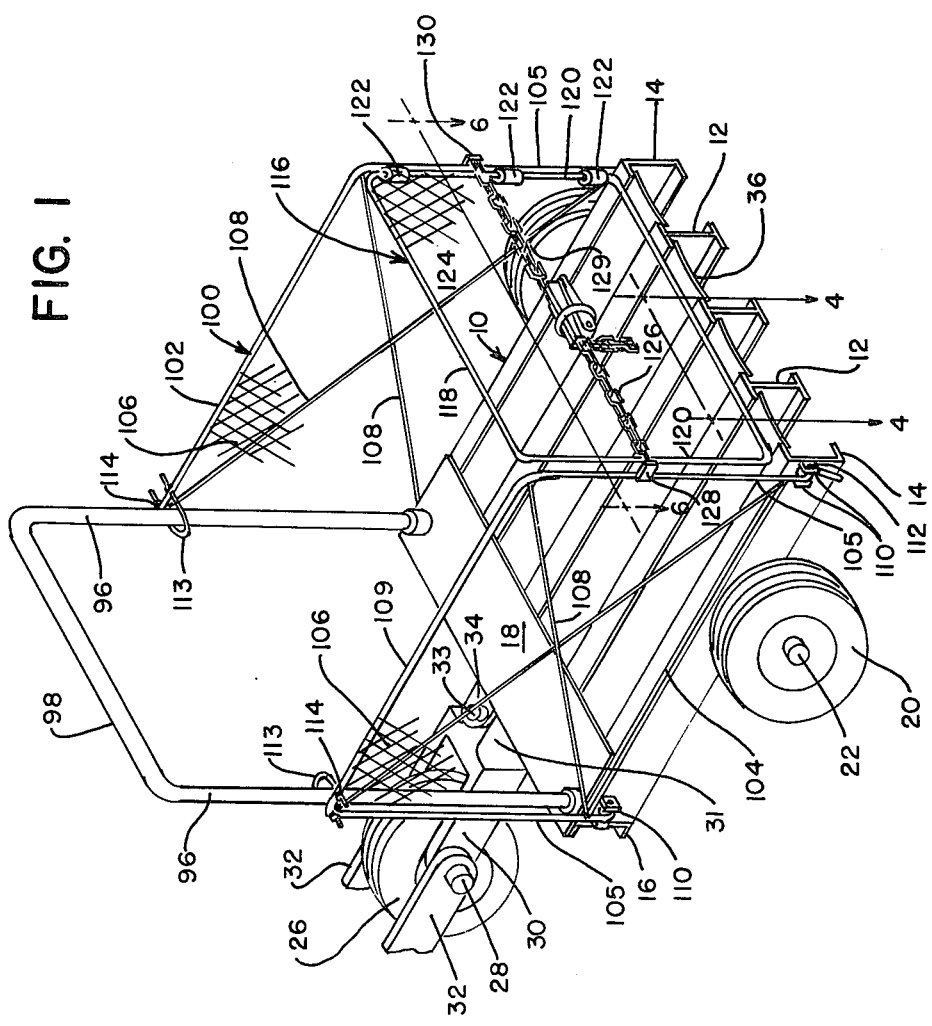
FIG. 1 is a perspective view of a trailer in accordance with the instant invention for accumulating bales of hay and other fodder.

Referring now to the drawings, and particularly FIG. 1, there is disclosed a wheeled trailer incorporating features of the instant invention, the trailer being adapted to be coupled to and towed by a side- or a rear-unloader-type hay baling machine, such machines conventionally including the necessary elements for the towing of equipment. The trailer includes a bed indicated generally at 10 comprised of a series of longitudinally-extending spaced I beams 12 and outer channel beams 14, the flanges of the beams defining gaps therebetween for the elevation of the tines of a fork lift head therethrough in the removal of stacked bales from the trailer as will be pointed out in detail hereinafter. The forward ends of the beams 12 and 14 are secured as by welding to a transversely-extending channel beam 16 (see FIG. 2). A deck plate 18 spans the width of the bead at the forward end thereof, the deck plate being suitably welded to channels 12, 14 and 16.

Figure 2:
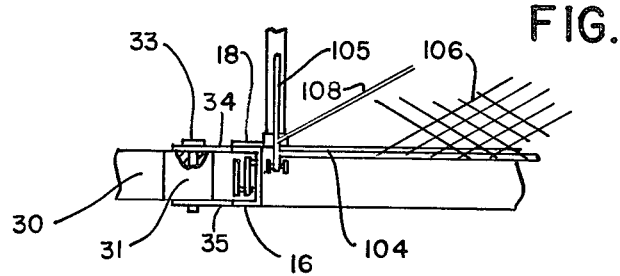
FIG. 2 is a partial side elevational view of the trailer of FIG. 1 with parts broken away for clearness of illustration.
Figure 3:
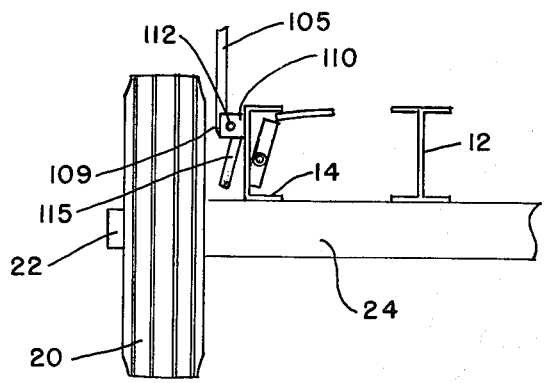
FIG. 3 is a partial end elevational view of the trailer of FIG. 1.

The trailer is preferably of the three-wheeled type, as shown, including rear wheels 20 mounted for independent rotation on an axle 22, the axle extending from wheel to wheel through a housing 24 which in turn is secured as by welding to the lower flanges of the beams 12 and 14 (see FIG. 3). Referring now particularly to FIGS. 1 and 2, the independent front wheel 26 is mounted for rotation on an axle 28 mounted in a clevis 30, the ends of the axle being received in bearing openings adjacent the ends of draw bars 32 of the hay baler (not shown). The rear end or tongue 31 of clevis 30 is mounted for horizontal rocking movement on a clevis pin 33 penetrating a bearing opening in the tongue and penetrating aligned openings in upper and lower tongues 34 and 35 respectively. The upper projecting end of the clevis pin is suitably headed and its lower projecting end receives a cottor pin or other securing means (not shown). Tongues 34 and 35 project forwardly of the bed of the trailer and are secured as by welding to the flanges of channel member 16 as disclosed in FIG. 2. The positioning of the rear wheels with respect to the longitudinal dimension of the trailer is such that the wheels will be to the rear of the center of gravity of the trailer when the latter is loaded.

The portion of the bed extending from deck plate 18 to the rear end of the bed provides a platform on which the bales received from the baler are stacked by hand by a workman. Inasmuch as this necessitates the movement of the workman from the deck plate 18, where the bales are received, onto the platform, means are provided to temporarily close the gaps between the upper flanges of the beams defining the platform to ensure the workman's safety.

Figure 4:
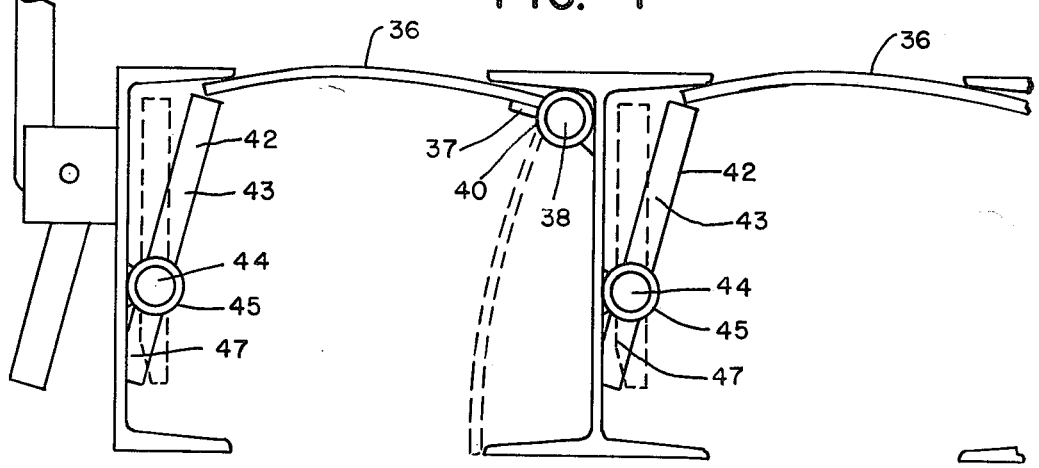
FIG. 4 is a sectional view on an enlarged scale taken on the line 4—4 of FIG. 1 looking in the direction indicated by the arrows.

Referring now particularly to FIGS. 1 and 4, such means comprises plate elements 36, preferably of the contour illustrated in FIG. 4 for purposes of rigidity, one longitudinal edge of each plate element, the edge to the right as illustrated in FIG. 4, being secured as by welding to spaced hinge elements 37 which are in turn secured as by being pinned or welded to a longitudinally-extending hinge pin or rod 38. Rods 38, which extend beyond the forward end of the platform and through suitable openings into the channel or channel beam 16, for a purpose later to be described, are mounted for rocking or rotational movement in annular bearing elements 40, the bearing elements for each rod being secured as by welding to their associated beam, there being, for example, three of such bearing elements, namely one adjacent each end of the platform and one in a central location. As will be understood, the hinge elements 37 are discontinued at the location of the bearing elements. The plate elements are adapted to be rotated from their gap-closing positions, as shown in full lines in FIGS. 1 and 4, to gap-opening, downwardly-inclined position shown by dotted lines in FIG. 4.

The operating linkage for the plate elements 36, which will be later described, is in its preferred embodiment of a character to, when the plate elements are swung to their closed positions, maintain them in such postions. However, additional support and locking means are preferably provided for this purpose to eliminate torsional deflection of the hinge rods 38 and ensure against yielding of the plate elements when the workman steps on one or more of them during the bale-stacking operation. The means for this purpose comprises support bars 42, there preferably being three support bars for each plate element with the support bars positioned suitably opposite to the plate element hinge points. The support bars are adapted for rotation or rocking movement between positions in which their upper ends underlie the free edges of the plate elements when the latter are in their gap-closing positions and positions in which they are removed therefrom. For this purpose, the support bars for each plate element are fixedly connected to a hinge rod 44 mounted for rocking movement in annular bearing elements 45 (see FIG. 4), one of the bearing elements suitably being adjacent each bar 42. The bearing elements are secured as by welding to the web of their associated beam. Each bar 42 has an arm 43 projecting upwardly from rod 44, the arm being of a length that when swung to the position of FIG. 4, the upper end of the arm will underlie the free edge of its associated plate element 36. Each support bar also includes a downwardly-extending arm 47 of such length that when the support bar is brought to the full line position shown in FIG. 4, the lower, preferably beveled end portion of the arm will contact the web of the associated beam and prevent further movement of the bar in a clockwise direction.

Referring now to FIGS. 5a–5d, a preferred embodiment of the operating linkages for rotating plate elements 36 between gap-opening and gap-closing positions and bars 42 between the positions in which they serve as support means for the plate elements and remote positions, are diagrammatically illustrated. As will be understood and as indicated in FIG. 2, the linkage is located within the channel of channel beam 16 into which hinge rods 38 for plate elements 36 and hinge rods 44 for support bars 42 project, but for the purpose of illustration in these diagrammatic views, the plate elements and bars as well as the linkage are shown, but the web of channel beam 16, which has openings therein through which the hinge rods 38 and 44 project, has not been shown.

The projecting ends of hinge rods 38 are each fixedly connected to an associated downwardly-extending level arm 46 and the opposite ends of the lever arms are each pivotedly connected by a pin 48 to a transversely-extending link 50, the link being common to the several lever arms 46. A link 52 is pivotedly connected to link 50 suitably at the point of pivotal connection of an outermost lever arm 46 to link 50. Link 52 has an end portion 54 of an upwardly contoured configuration to accommodate other elements of the linkage, as will be noted hereinafter, the end of the contoured portion being pivotedly connected as at 56 to a manually-operated lever member or handle 58. The lower end of lever member 58, and at a point spaced inwardly of pivot point 56, is pivotedly connected as by a pin 60 to a fixed element 62 of the frame structure. Lever member or handle 58 is suitably bent or contoured outwardly at a suitable point, as for example the location 63, to a sufficient extent that the handle may be swung from the position of FIG. 5a to the position of FIG. 5b without contact with the flanges of channel beam 16.

Figure 5A:
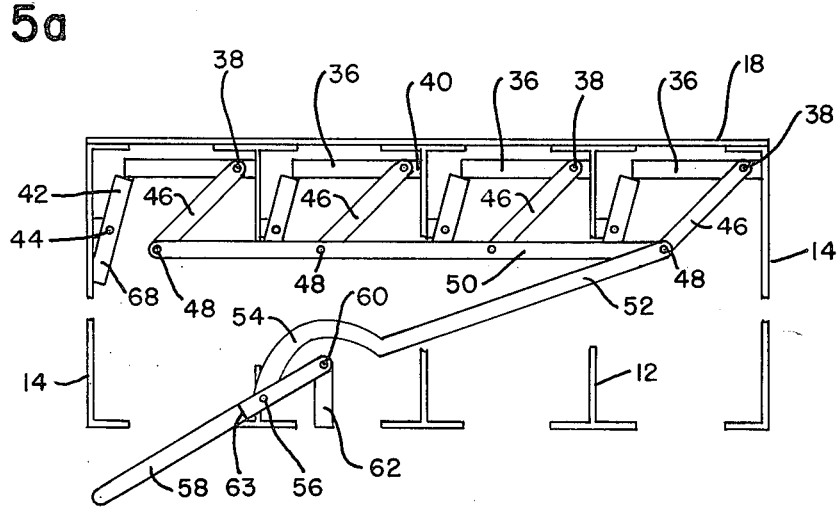
FIGS. 5a –5d are diagrammatic views illustrating certain mechanisms of the invention.
Figure 5B:
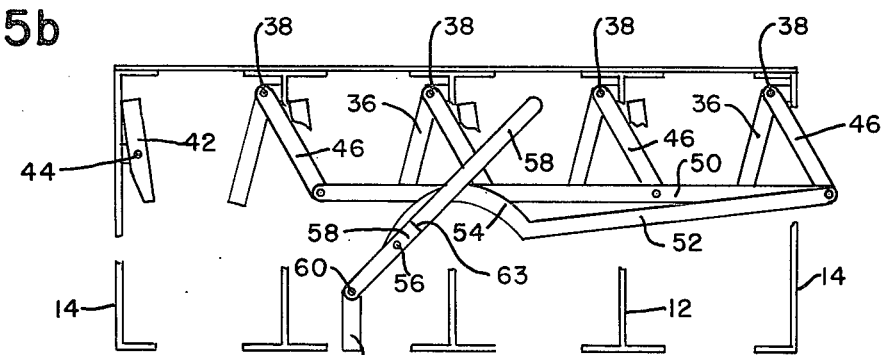

As will be understood in the operation of the linkage as so far described, when the lever arm or handle 58 is rotated from the position illustrated in FIG. 5b to the position illustrated in FIG. 5a, plate elements 36 will in unison be swung from gap-opening to gap-closing positions. Also, inasmuch as when the handle is moved to such position, pivot point 56 connecting the end of link 52 to the handle has passed dead center in relation to pivot point 60, the plate elements will normally be retained in their closed positions until lever 58 is again rotated to swing the plate elements from the position of FIG. 5a to the positions of FIG. 5b.

Figure 5C:
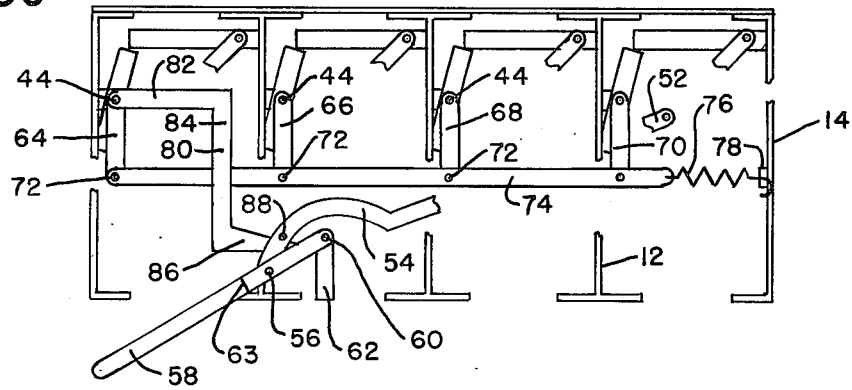
Figure 5D:
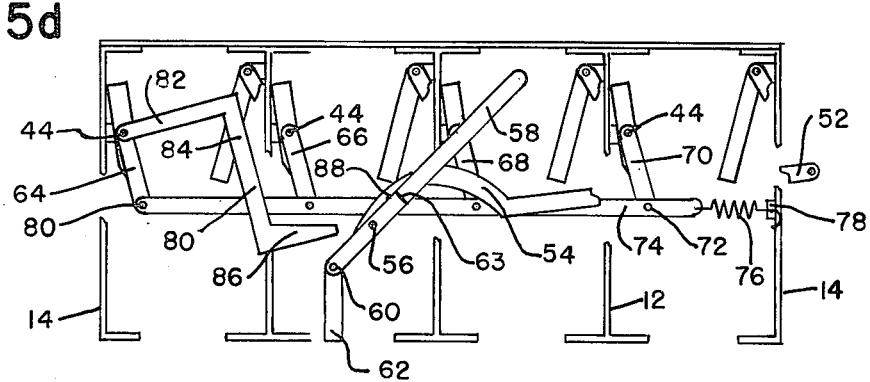

Referring now particularly to FIGS. 5c and 5d, the ends of rods 44 which project through openings in the web of channel beam 16 are fixedly attached to, and hence are adapted to be rotated by, the upper ends of downwardly-projecting individual level members 64, 66, 68 and 70, the lower ends of the lever members being rockably attached as by pivot pins 72 to a common link 74. One end of the link 74, namely the end adjacent lever member 70, is connected as by a tension spring 76 to an outwardly-projecting lug 78 secured as by welding to the web of the transverse channel beam 16 (not shown in FIGS. 5a–5d) or to any other suitable fixed element of the frame structure. An approximately L-shaped lever member 80 has a horizontal arm 82, the free end of which is fixedly attached to the hinge rod 44 to which lever member 64 is also affixed. Arm 82 extends inwardly from hinge rod 44 and is suitable integrally joined to a vertical arm 84 of lever member 80, arm 84 terminating in an inwardly and downwardly-extending arm 86 so located that when the various elements of the linkage are in the position of FIGS. 5a and 5c, it will lie behind arched portion 54 of link 52. Arm 86 is positioned to underlie a pin 88 affixed to and projecting inwardly from the arched portion 54 of link 52 when the link is moved, as by manual manipulation of lever 58, from the position shown in FIGS. 5b and 5d to a position approaching that of FIGS. 5a and 5c, and upon further movement of the lever in a counterclockwise direction. Alternatively to employing separate lever members 64 and 80 individually affixed to hinge rod 44, the lever members may be combined to form an approximately U-shaped lever.

In operation, the support bars, when unrestrained, will remain in the retracted position of FIGS. 5b and 5d, due to the tension exerted by spring 76 on link 74, and lever member 80 will be rocked to the position shown in FIG. 5d. However, when the manually-operated lever 58 is swung from the position of FIG. 5b to the position of FIG. 5c, the final increment of such swinging movement brings pin 88 into contact with arm 86 to rock lever member 80 and hence to rock the hinge rod 44 to which it is affixed in a clockwise direction. The rocking of this hinge rod produced through lever member 64, link 74 and lever members 66, 68 and 70, corresponding rocking movements of the other hinge rods 44. Arm 86 of lever member 80 is so positioned relative to pin 88 that the rocking movement is that required to bring the bars into the positions illustrated in FIGS. 5a and 5c with their upper ends underlying the free margins of plate elements 36, the latter having been elevated at this point to substantially their full extent and slightly above the upper ends of the support bars. The combination of the mechanical advantage of various of the levers, the weight of members of the linkage and frictional drag in comparison to the tension exerted by spring 76, is sufficient to prevent the spring from moving lever 58 from the position shown in FIG. 5c. However, additional manually-operated means (not shown) of any suitable type may be employed to maintain lever 58 in such position during the period in which the plates 36 are performing their gap-closing functions.

Referring now to other features of the trailer, it is provided adjacent its forward end with a frame structure comprising uprights 96, having their lower ends secured as by welding to deck plate 18, and a connecting cross member 98, members 96 and 98 suitably consisting of pipe sections. Cross member 98 is at such an elevation above the trailer bed as to permit ready access by a workman to the bed, as, for example, seven feet. The trailer also includes side walls 100, each consisting of a rectangular frame formed of upper and lower longitudinal rails 102 and 104 respectively, the rails being connected by uprights 105. The rails and uprights are suitably formed of pipe and may be secured together as by welding. A wire mesh 106 of any suitable type is secured as by welding to the rails and uprights of each wall for confining the stacked bales within the bed. Also, to reinforce the walls, stabilizing rods 108 are preferably employed, the rods extending diagonally of the side walls and having their ends secured as by welding to the side wall frame elements.

Referring now particularly to FIGS. 1 and 3, the lower end of each upright 105 has an offset portion 109 hingedly connected to the outer face of the web of an associated channel beam 14 of the trailer bed. The hinge may be of any suitable construction, but as shown, comprises spaced lugs 110, receiving the end of the offset portion therebetween, the lugs being welded to the web of the beam, and a hinged pin 112 having its ends secured to the lugs, the pin projecting through a circular aperture (not shown) in the offset portion. Due to the fact that by this arrangement, the centers of gravity of the side walls are outside the hinge line, the side frames will, when not otherwise restrained, rotate or swing outwardly. To limit such outward rotation, the upper rails of the side walls adjacent the forward end thereof are provided with U-shaped clevises 113 with their legs penetrating apertures in the rails. The clevises are secured in any adjusted position, to limit the outward swinging movement of the wall to the desired extent, by nuts 114 on threaded end portions of the legs. Referring to FIG. 3, to limit the outward rotation of the side walls at the rear of the trailer, the offset portions 109 of uprights 105 are provided at their ends with downwardly and somewhat outwardly extending portions 115. As will be understood, when the side walls are unrestrained, they will rotate outwardly on hinge pins 112, the extent of such rotation, however, being limited by the adjusted positions of clevises 113 and by contact of portions 115 with the webs of the associated channel beams 14.

The trailer includes an end gate 116 comprising a rectangular frame suitably formed of horizontally- and vertically-extending pipe sections 118 and 120 respectively, welded or otherwise secured together similarly as the frames for the side walls. The gate is mounted for swinging movement between opened and closed positions on the rear upright 105 of one of the side walls, the side wall to the right as shown in FIG. 1, by hinge elements 122. Wire mesh 124 is secured as by welding or other suitable means to the frame elements of the end gate similarly as in the case of the side walls. Also, a stabilizing rod (not shown) extending diagonally from an upper to a lower corner of the frame may be employed.

Figure 6:
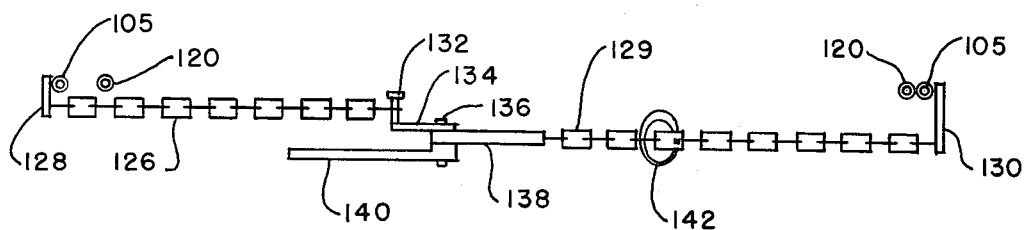
FIG. 6 is a sectional view taken on the line 6—6 of FIG. 1 looking in the direction indicated by the arrows and disclosing certain elements in one condition thereof.
Figure 7:
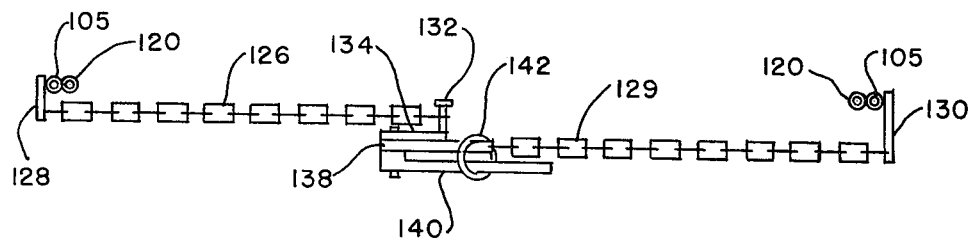
FIG. 7 is a sectional view corresponding to FIG. 6, but showing the elements in a second condition thereof.

The means for releasably securing the gate in its closed position for the stacking of bales thereagainst and which, in the preferred embodiment, is combined with means for maintaining the side walls in their erect positions for the stacking operation will now be described. Referring particularly to FIGS. 1, 6 and 7, the means for this purpose comprises a chain length 126 having one end secured as by welding to a lug 128 which in turn is secured as by welding to the upright 105 opposite to that on which the gate is hinged, and a second chain length 129 having one end secured as by welding to a lug 130 on the upright 105 on which the gate is hinged. A suitably headed pin 132 projecting from a lever arm 134 is adapted to readily receive any selected link of chain section 126. Lever arm 134 is fixed to a pin 136 for rotation therewith the pin extending through and being rotatable in an aperture in a bar 138 and having its other end affixed to an operating lever or handle 140. The other end of chain length 129 is secured in any suitable way, as by welding, to the end of bar 138 opposite to the end receiving pin 136. When gate 116 is swung to its closed position and is to be secured in such position and the side walls are to be brought from their outwardly swung positions to erect positions, a selected one of the links of chain section 126 is mounted on pin 132. Handle 140 is then rotated from the position illustrated in FIG. 6 to the position illustrated in FIGS. 1 and 7, causing corresponding rotation of lever arm 134 and a consequent drawing of the side walls into their erect positions. A metal loop element 142 mounted on chain section 129 and having an inner diameter to relatively snugly receive an end portion of handle 140 as well as chain section 129 or bar 138 is then slipped over the handle to hold it in place as illustrated in FIGS. 1 and 7. As will be understood, when the gate is to be opened, loop element 142 is moved to the right of its position shown in FIGS. 1 and 7 to release handle 140 and the handle is then rotated to the position of FIG. 6 and the link of chain section 126 is removed from pin 132. The gate may then be swung outwardly on its hinges 122.

Figure 8:
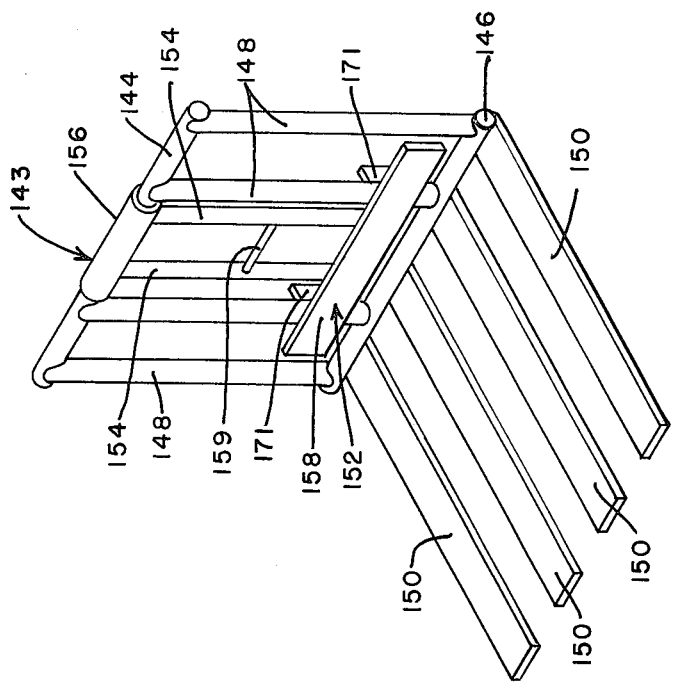
FIG. 8 is a perspective view of a fork lift head for employment with the trailer of FIG. 1.
Figure 9:
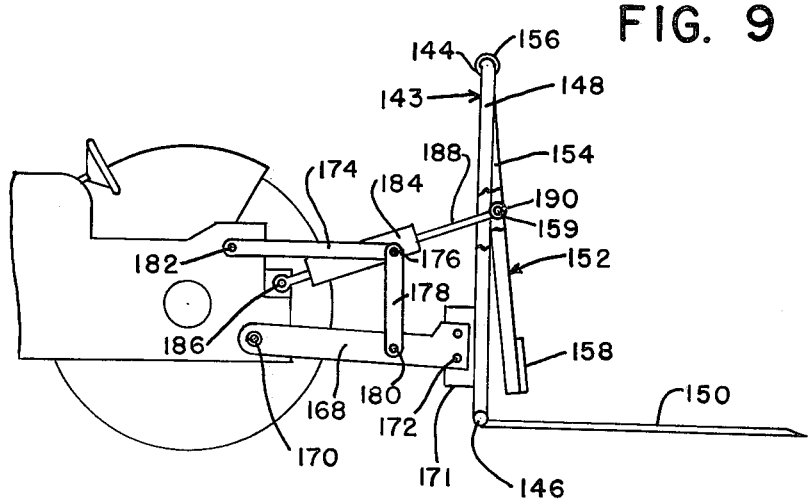
FIG. 9 is a side elevational view, with portions broken away for clearness of illustration, of the fork lift head of FIG. 8 attached to the rear end of a tractor.

Referring now particularly to FIGS. 8 and 9, the fork lift head for attachment to a tractor or other farm vehicle, and which is adapted to remove the stack of bales from the trailer when the gate 16 is open and plate elements 36 are swung to gap-opening positions, will be described. The fork lift head indicated generally by the reference character 143, and which is basically of conventional construction, comprises a rear frame structure composed of upper and lower rails 144 and 146 connected by spaced vertical members 148. The rails and vertical members are suitably formed of pipe sections and are secured together as by welding. Lower rail 146 has secured thereto as by welding a series of tines 150 comprising flat metal bars, there being a tine positioned to be received in each gap formed in the trailer bed when the plate elements 36 are in their open positions, the tines being of a width to be readily received in the gaps and of a length to extend approximately to deck plate 18 when the end frame of the fork lift head is adjacent the ends of beams 12 and 14.

In accordance with the instant invention, the fork lift head includes a push-off device indicated generally at 152, the push-off device comprising vertically-extending arms 154, which may be pipe section or flat bars, as desired, secured at their upper ends as by welding to a sleeve 156 mounted for rocking movement on the upper transverse frame element 144. A push-off plate 158 is secured as by welding to the lower ends of arms 154, the push-off plate being of a length to approximately span the width of the head and being so verically positioned as to contact the lowest tier of a stack of bales carried by the tines of the head. A transverse cylindrical bar 159, suitably in pipe section, has its ends secured as by welding to arms 154 at a location intermediate sleeve 156 and plate 158, bar 159 serving as a reinforcing element and also as a mounting for an element of the operating means for the push-off device, as will be pointed out below.

Referring now particularly to FIG. 9, the fork lift head is shown as being supported by a vehicle such as a farm tractor by conventional means for movement between lowered and elevated positions. Such conventional means includes draw bars 168, one such draw bar being illustrated in FIG. 9, with one end of each draw bar being pivotally mounted as indicated at 170 on the tractor chassis and its other end affixed to a bracket element 171 of the rear frame of the fork lift head as indicated at 172. The means for rocking each draw bar on its pivot point 170 includes an arm 174 having an outer end pivotally connected as at 176 to a link 178 which in turn is pivotally connected as at 180 to the draw bar. The inner end of arm 174 is connected to conventional apparatus of the tractor (not shown) for rotating the arm about a pivot point 182. To operate the push-off device, a hydraulic piston/cylinder unit 184 of conventional type is employed, the piston/cylinder unit being supported for rocking movement on the tractor chassis by pivot pin 186. The piston rod 188 of the piston/cylinder unit has a transversely-extending sleeve 190 at its outer end, the sleeve receiving bar 159 and serving to connect the piston rod to the push-off device but at the same time permitting the necessary rocking movement of the bar in the sleeve. Alternatively, other suitable means may be employed for the connection of piston rod 188 to bar 159. Conventional means are employed for controlling the operation of the hydraulic piston/cylinder unit to rock the push-off between retracted and advanced positions. It will be understood that while the fork lift head disclosed in FIG. 8 is attached to the rear of a tractor, it may be attached to and operated by other mobile equipment such as a front end loader.

As pointed out earlier in the specification, in the operation of the fork lift head, following the completion of the stack of bales on the trailer, the rotation of the plate element 36 to their gap-opening positions, and the opening of the end gate and release of the side walls, the fork lift head is moved by the tractor to bring the free ends of the tines 150 in alignment with the gaps. The head is then lowered or raised as required to position the tines below but relatively adjacent the bottom of the stack of bales exposed by the gaps, and the tractor is then further moved to advance the tines until they underlie the stack. The fork lift device is then elevated by the elevation of drawn bars 168 by the conventional means previously noted to move the tines through the gaps and elevate the stack above the platform of the trailer. The tractor then transports the stack to the place of deposit at which point the draw bars 65 are swung downwardly until the outer ends of the tines contact or substantially contact the surface on which the stack is to be positioned. The tractor is then driven forwardly and simultaneously push-off device 152 is operated by its hydraulic piston/cylinder unit to force the stack from the tines. Particularly if in the stacking operation the bales of the second layer are placed at right angles to the bales of the first or base layer, as is the normal procedure, it is only necessary for the push-off device to move a relatively short distance to discharge the stack.

While the trailer and associated fork lift head have been described for use particularly in the collection and removal of bales of hay or other fodder, it will be understood that they can be used in combination or individually to perform many other services around a farm such as the handling of cut logs, sacks of grain or other materials, palletized small items, and various items of equipment and the like. In such case, the trailer may be drawn by any suitable means such as a tractor.

I claim:

1. A moble unit for the accumulation of items such as hay bales in the form of a stack for the removal of said items as a stack by an independent fork lift apparatus having tines, said unit comprising a platform including spaced stack-supporting members defining elongated gaps therebetween, said members being constructed and arranged to permit the insertion of said tines of said fork lift apparatus below said gaps and the movement of said tines therethrough, and said platform additionally including closure means mounted for movement between positions in which they close said gaps and positions in which they expose said gaps for said movement of said tines therethrough and there is means for moving said closure means between said positions.

2. A mobile unit for the accumulation of items such as hay bales in the form of a stack and for the removal of said items as a stack by fork lift apparatus having tines, said unit comprising a platform including spaced stack-supporting members defining elongated gaps therebetween, said members being constructed and arranged to permit the insertion of the tines of a fork lift apparatus below said gaps and the movement of said tines therethrough, closure means mounted for movement between positions in which they close and expose said gaps, means for moving said closure means between said positions, means for securing said closure means in said gap-closing positions and means for releasing said securing means.

3. A mobile unit as defined in claim 2 wherein said closure means comprises plate elements and hinge means hingedly connecting said plate elements to said supporting members, and said means for moving said closure means between gap-closing and gap-opening positions comprising means for rotating said plates on said hinge means between said positions.

4. A mobile unit as defined in claim 3 wherein said means for rotating said plate elements between gap-closing and gap-opening positions comprises arms projecting from said hinge means, a linkage connected to said arms, and means for moving linkage to cause said rotation of said plate elements.

5. A mobile unit as defined in claim 4 wherein said securing means comprising support elements for association with each of said plate elements, means rockably mounting said support elements for movement between positions in which they underlie the other of said longitudinally-extending edge portions of their associated plate elements when said plate elements are in their gap-closing position and positions removed therefrom.

6. A mobile unit as defined in claim 5 wherein there is means comprising linkage common to said support elements for causing movement of said support elements between said positions.

7. A mobile unit for the accumulation of items such as hay bales in the form of a stack and for the removal of said items as a stack by fork lift apparatus having tines, said unit comprising a platform including space stack-supporting members defining elongated gaps therebetween, said member being constructed and arranged to permit the insertion of the tines of a fork lift apparatus below said gaps and the movement of said tines therethrough, said unit including spaced walls extending upwardly from said platform adjacent opposed edges thereof, and means mounting said walls for rocking movement between positions in which they are substantially vertical planes relatively to said platform and outwardly inclined planes.

8. A mobile unit as defined in claim 7 wherein there is releasable means for retaining said walls in said substantially vertical planes relatively to said platform and wherein said means mounting said walls includes means for causing said walls to rock from said substantially vertical planes to said outwardly inclined planes when said retaining means is released.

9. A mobile unit as defined in claim 8 wherein there is a hingedly-supported gate structure, said gate structure being swingable between a closed position in which it substantially spans the space between said walls when said walls are in their substantially vertical planes and an outwardly-swung open position.

10. A mobile unit as defined in claim 9 wherein said releasable means for retaining said walls in their substantially vertical positions relatively to said platform includes means for restraining said gate structure from movement from its closed position to an outwardly-swung open position.

11. A mobile unit as defined in claim 8 wherein there is means for predetermining said inclined planes including means for preventing further outward swinging movement of said walls when they reach said planes.

12. A mobile unit as defined in claim 2 wherein there are spaced walls extending upwardly from said platform adjacent opposed edges thereof, and there is means mounting said walls for rocking movement between positions in which they are in substantially vertical planes relatively to said platform and outwardly inclined planes.

13. A mobile unit as defined in claim 2 wherein there are spaced walls extending upwardly from said platform adjacent opposed edges thereof, there is means mounting said walls for rocking movement between postions in which they are in substantially vertical planes relatively to said platform and outwardly-inclined planes, and last-named means including means for causing said walls, when unrestrained, to rock from said substantially vertical planes to said outwardly-inclined planes, and there is releasable means for restraining said walls against said outward rocking movement.

14. A mobile unit as defined in claim 13 wherein there is a hingedly-supported gate structure swingable between a position in which it substantially spans the space between said walls when said walls are in their substantially vertical planes and an open position, and said releasable means restraining said walls against outward rocking movement includes means for restraining said gate structure against movement from its closed position to its outwardly swung open position.

* * * * *